Nov. 24, 1942.　　　　W. R. DRAY　　　　2,303,200
THRESHING MECHANISM
Original Filed July 1, 1935　　2 Sheets-Sheet 2
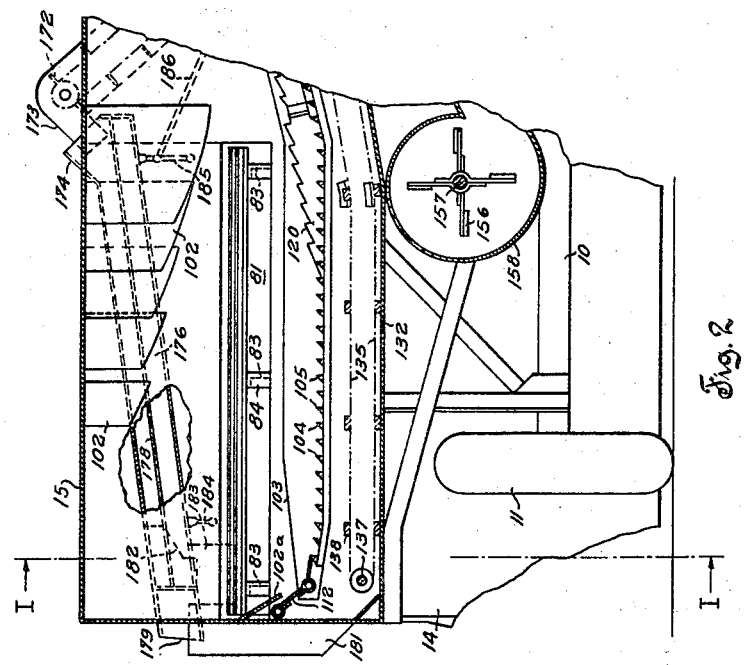

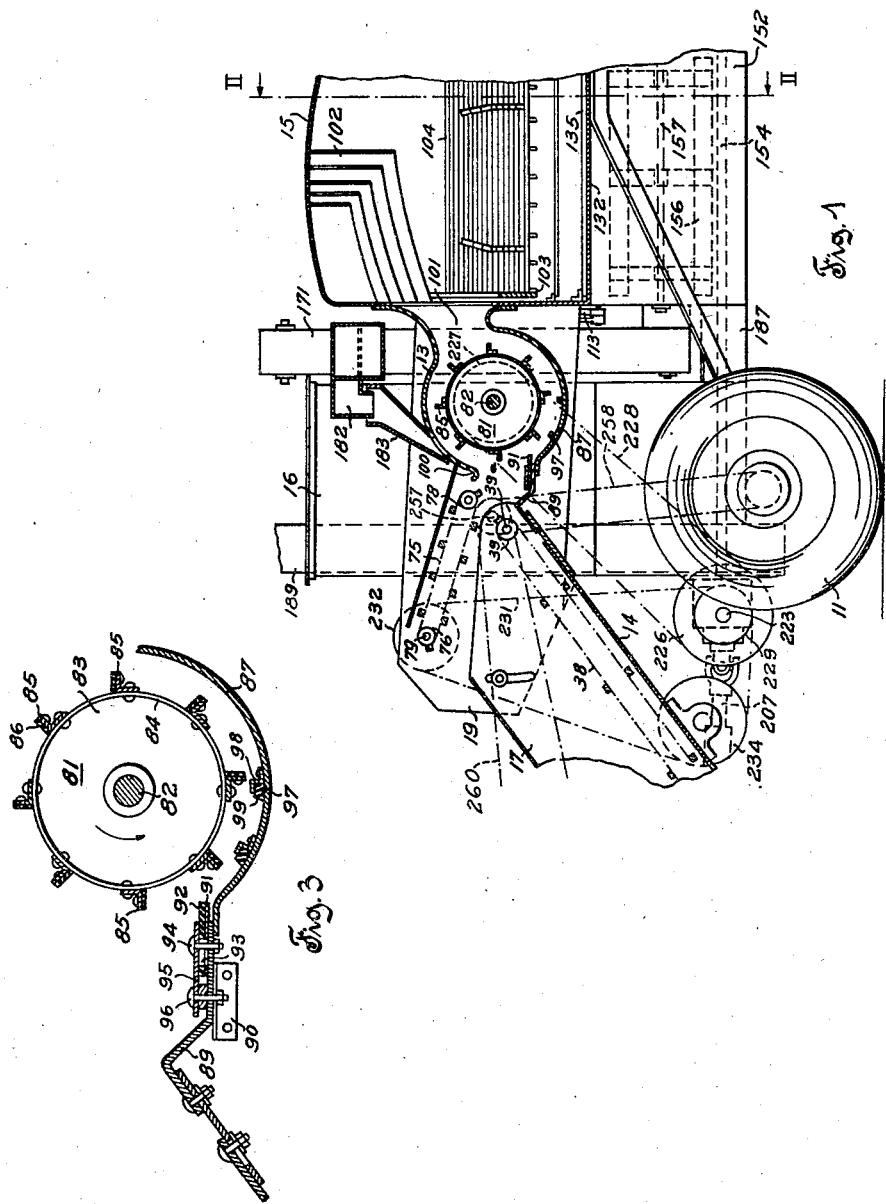

Patented Nov. 24, 1942

2,303,200

UNITED STATES PATENT OFFICE 2,303,200

THRESHING MECHANISM

Walter R. Dray, Kendall Township, Kendall County, Ill., assignor to Allis-Chalmers Manufacturing Company, Milwaukee, Wis., a corporation of Delaware Original application July 1, 1935, Serial No. 29,216. Divided and this application June 29, 1940, Serial No. 343,127

11 Claims. (Cl. 130—27)

This invention relates in general to improvements in threshing machines, and it has special utility in connection with the type of threshing machines known as harvester-threshers or combines through which the crop may be both harvested from the field and threshed during the travel of the machine through the field; and the invention is more particularly concerned with improvements in the mechanism of such machines which threshes or removes grain or seed from the straw or stalks.

The present application is a division of applicant's copending application, Serial No. 29,216, filed July 1, 1935.

Prior forms of threshing machines which have been in commercial use to any appreciable extent have an operating disadvantage that an undue amount of grain or seed removed from the stalks is cracked or broken in the threshing mechanism, and this defect is more apparent if the grain is threshed when ripe and dry. In such prior machines, the results of the rubbing and beating of the grain by and against the hard surfaces of the threshing elements, particularly in threshing ripe grain, has been to crack and break an undesirably large portion of the threshed grain or seeds. And this tendency to crack and break the grain or seed has forced the necessity of limiting the speed of the threshing cylinder, and hence the capacity of a machine, in order to avoid an undue amount of cracking of the threshed grain or seed.

The present invention has for an object and contemplates the provision of threshing mechanism for use in threshing grain or the like, wherein efficient threshing may be secured with a minimum of breakage and cracking of the grain kernels or seeds, and wherein this desired result may be satisfactorily obtained at such relatively high operating speeds of the threshing cylinder as will afford an increased capacity, with maximum clean grain recovery, of a threshing machine or harvester-thresher of a given weight. This facility for operation of the threshing mechanism at increased speed without undue breaking or cracking of the grain kernels is of particularly great advantage in connection with harvester-threshers, especially toward enabling the production of such a machine of light weight which can be propelled through the field at relatively high speed and correspondingly great capacity with minimum power requirements. And desirable operating advantages are heightened by feeding the grain or seed bearing stalks, in the direction of their length, to a threshing cylinder and stationary threshing element or concave of extended axial length, so that the grain or seed may pass in a relatively thin or shallow stream of extended width into and through the threshing mechanism; and such a threshing mechanism, in addition to securing efficient removal of a high percentage of the grain or seed from the stalks, will pass the stalks through the threshing mechanism with a minimum of breakage of the straw, a decided advantage in the recovery and subsequent handling and utilization of the straw.

It is also an object of this invention to provide an improved and simple design of threshing mechanism for a threshing machine wherein the active threshing elements are of extended length and provided with yielding facings at those portions which come into forcible contact with the grain or seed to be threshed.

It is a further object of this invention to provide an improved threshing mechanism of this character embodying a rotary threshing cylinder having circumferentially spaced and relatively rigid threshing bars of extended length provided at their active leading faces with rubber or like yielding coverings.

It is a further object of this invention to provide an improved threshing mechanism of this character embodying, in conjunction with the rotatable threshing bars of the cylinder, a cooperative stationary concave element having spaced threshing projections of extended length and likewise having a rubber or like yielding facing at the leading edges of such projections.

These and other objects and advantages are attained by the present invention, various novel features of which will be apparent from the description and accompanying drawings, disclosing an embodiment of features of the invention, and will be more particularly pointed out in the claims.

In the accompanying drawings:

Fig. 1 is a fragmental vertical sectional plan view of a harvester-thresher, such as is disclosed in the above mentioned parent application, the plane of section being that of the line I—I of Fig. 2;

Fig. 2 is a fragmental vertical sectional elevation in the plane of the line II—II of Fig. 1; and Fig. 3 is an enlarged fragmental sectional view in the plane of the line II—II of Fig. 1.

Referring to the drawings, wherein are shown parts of a harvester-thresher apparatus, such as is disclosed in applicant's parent application mentioned hereinabove, a main support for the apparatus may be in the form of a steel tube 10 extending transversely of the normal direction of travel of the apparatus, and carrying journals for the supporting traction wheels 11. On the support 10 is mounted a supporting framework carrying a supporting and enclosing housing 13 for the threshing mechanism, with an auxiliary header frame 14 carried by the latter housing, and a housing 15 for the separating mechanism, the latter communicating with the discharge side of the housing for the threshing mechanism and extending transversely thereof. A grain storage bin 16 is mounted on the frame forwardly of the separator housing 15.

The header frame 14 is of troughlike form open at its forward and rear ends and has side walls 17 which may be flanged at their upper edges through the major portion of their length. The side walls of the header frame fit closely within side walls 19 of the housing 13 for the threshing mechanism at the open forward side thereof, and the header frame is mounted on the housing 13 through a pivotal connection between the side walls of the header frame and the side walls of the housing 13, so that the lower forward edge of the header frame may be swung up and down to a desired position of adjustment relative to the ground. A suitable cutting sickle and guard therefor are mounted at the lower or forward edge of the header 14; and an upwardly traveling belt type feed draper 38 is mounted on the header to carry the harvested grain from the forward end of the header. As will be apparent, the forward end of the feed draper travels about a suitable guide roller mounted on the header adjacent the forward end thereof; and a known type of rotatable gathering reel may be suitably mounted on the forward portion of the header frame so as to lie over the sickle.

The draper belt is preferably of a width substantially equal to the width of the header at its rear end, and it travels over a driving roller 39 having shaft journals rotatably mounted in bearings on the side walls 17 of the header frame near the upper end thereof and on the adjacent portions of the side walls 19 of the housing 13, the driving shaft of this upper roller preferably being coincident with the axis on which the header frame has its pivotal movement on the side walls of the housing 13. This driving shaft, indicated at 39a, projects through the outer side wall 19 of the housing 13.

An endless feeding conveyor 75, in the form of a draper belt preferably provided with transverse bars or slats on the working surface thereof, is driven by a driving roller 76 and travels over a second roller 78 disposed above and somewhat beyond the upper roller 39 of the conveying draper 38, the rollers 76 and 78 being mounted in bearings in the side walls 19 of the housing 13. The rollers 76 and 78 are so positioned and the feeding draper 75 is so driven that the lower course of the latter draper travels, like the upper course of the conveying draper 38, toward the threshing mechanism in the housing 13, and the working surfaces of the two drapers gradually approaching each other to produce a throat or restricted area over the upper roll 39 of the draper 38. The lower surface of the draper 75, particularly at its inner end, is adapted to press against and advance material which has been fed along and by the working surfaces of the draper 38.

The threshing cylinder, indicated generally at 81, comprises an operating shaft 82 rotatably mounted in bearings in the side walls of the housing, and a plurality of spaced annular members or disks 83 mounted on the shaft, with the peripheral flanges of the disks turned over at right angles to the planes of the disks, as indicated at 84. Secured to the peripheral flanges 84 of the disks 83 are a plurality of spaced thresher bars 85 in the form of sections of angle iron extending longitudinally of the cylinder in the general direction of the axis thereof, one flange portion of each bar being secured to the flanges 84 and the other substantially radially extending flange portions serving as active threshing elements. For a purpose that will be more particularly referred to hereafter, the leading faces of the thresher bars are provided with a wearing surface of relatively flexible rubber or like resilient material, as indicated at 86, vulcanized or otherwise attached to the bars, to constitute a longitudinally extending and continuous or unbroken impact threshing face lying substantially radially of the cylinder; and this resilient facing extends outwardly to approximately the radially outer edge of the bar, leaving such latter edge of the bar uncovered and substantially smooth and unbroken. The angle iron bar thus acts as a support or reinforcement for the resiliently yieldable threshing surface portion of the threshing bar element.

The stationary concave element with which the thresher bars cooperate in the threshing operation includes a generally circular and preferably imperforate housing portion 87 beneath the threshing cylinder and a throat or ledger plate assembly at the forward edge of this housing portion, this assembly comprising a bent plate 89 having a portion adjustably mounted on the bottom wall of the header frame and having its rear edge resting on angle plates 90 secured to the side walls 19 of the housing 13 and extending over or in close proximity to the leading edge of the housing portion 87. An adjustable choking or ledger plate 91 is mounted and secured in position at the rear edge of the plate 89, and extends beyond the same toward the threshing cylinder into close proximity to the path of the thresher bars 85. This ledger plate is preferably in the form of a steel plate having a wearing or working surface of rubber or like flexible resilient material 92, riveted, vulcanized, or otherwise secured to the steel plate. The ledger plate may be adjustably secured in position to permit movement of its rear edge toward and from the threshing cylinder, and thus most efficiently accommodating for wear of the rear edge of the ledger plate and for diverse characteristics of various crops to be threshed, particularly as to size or character of the grain kernels or seed and the stalks, by being provided with elongated slots 93 through which pass bolts 94 which, in cooperation with the plate 89 and an upper clamping plate 95 and bolts 96 and a cooperating spacer at the forward edge of this clamping plate, serve to clamp the ledger plate in any desired position of adjustment of its rear edge with respect to the path of the threshing bars.

On the upper surface of the concave housing 87 raised portions or relatively rigid bars or strips 97 are provided, these latter extending generally parallel to the axis of the threshing cylinder and projecting into relatively close proximity to the path of the thresher bars 85. These bars or strips may be in the form of raised portions of the housing or bars secured to the housing and covered at their forward surface, and preferably at the upper surface, with a substantially continuous or unbroken wearing surface of rubber or like material; but, as shown in the drawings, these bars or strips are preferably in the form of rubber strips secured in place on the housing 87 by angular clamping strips 98 which engage the upper surfaces of the rubber strips and are provided with flanges secured to the housing 87. The leading edges of these concave threshing bars or strips are preferably inclined rearwardly, as indicated at 99, for a purpose which will be referred to hereinafter.

The upper portion of the housing for the threshing cylinder follows and is relatively closely spaced from the path of the threshing bars 85 to a point adjacent the end of the upper feeding draper 75, the forward end of the housing being easily curved, as indicated at 100, and serving to guide grain downwardly toward the ledger plate 91 and the threshing bars moving past the same.

In order to best accommodate the apparatus for threshing various kinds and conditions of crops, the bearings for the shaft 82 of the threshing cylinder are mounted, in a conventional manner, so as to be adjustable toward and from the active threshing portions of the concave. With such an arrangement, the space between the path of travel of the radially outer edges of the rotating threshing bars and the radially inner edges of the concave threshing projections may be varied to best facilitate the passage of the threshed grain or seeds and the stalks of the crop.

In the operation of the threshing mechanism, the harvested grain is moved upwardly along the conveying draper 38 toward its discharge end where the feeding draper 75 cooperates in moving the grain toward the threshing mechanism and into the path of travel of the threshing bars 85, and the latter, moving at a relatively high speed, beat the grain kernels from the straw and force or draw the threshed grain and straw between the threshing bars and the rear edge of the ledger plate. During this operation, the heads of grain are forcibly projected against the rear edge of the ledger plate and then carried beyond the same by the rotating threshing bars, the latter carrying the grain and straw past the threshing bars and the concave, the cooperative movable and fixed threshing bars serving to beat the grain from the heads as the latter and the straw are passed through the space between the cylinder and the concave.

Due to the fact that there is considerable fan action of the rapidly rotating threshing cylinder, particularly through the threshing bars acting as fan vanes, a considerable current of air is induced along the normal path of flow of material passing through the threshing mechanism, and this induced draft assists in forcing the straw and threshed grain from the housing of the threshing cylinder toward and through the discharge therefrom into the separator housing 15.

It is a recognized fact that the efficiency of the threshing operation is ordinarily increased with the speed of operation of the threshing cylinder; but it is also recognized that increase in the speed of the threshing cylinder beyond a certain point causes damage to the threshed grain, particularly in the matter of cracking the same; and this defect is probably more apparent in the threshing of crops other than grain, as for instance, beans. This cracking results in great part from the fact that the kernels or seeds are thrown or batted by the movable threshing bars against the concave with very considerable force. The advantages of high speed of the threshing mechanism and efficient operation under high speeds of the threshing cylinder are attained by means which are intimately concerned with the provision of the rubber or like wearing surfaces on the leading faces of the rotatable threshing bars and the ledger plate and threshing projections of the concave. With the provision of these flexible and resilient surfaces, the grain kernels or seeds, when struck by the movable threshing bars, are thrown by the latter against the ledger plate and the threshing projections of the concave from which they rebound with great force into the path of succeeding threshing bars, the inclined forward faces 99 on the fixed threshing elements of the concave facilitating this action; and the general effect is to secure a very thorough separation of the grain from the stalks in the threshing mechanism, and all without any serious damage to the grain kernels or seeds from the impingement upon the active surfaces of the threshing elements, even under high operating speeds.

The discharge opening or passage 101 from the housing of the threshing cylinder extends across the full width of the cylinder and opens into the forward portion of the separator housing 15 through the adjacent wall thereof. This discharge passage is preferably generally above the horizontal plane through the axis of the cylinder; and the straw and grain discharged from the cylinder housing with considerable force, due to the relatively high speed of the cylinder and the fan effect thereof, is blown or forced across the separator housing with a generally upward component and with a tendency to whirl and pile up on the portion of the separating mechanism adjacent the inner edge of the threshing cylinder. This forcible expulsion of material from the threshing cylinder tends to keep the threshing cylinder clear with little tendency to clogging, and it is a desirable feature in efficient threshing. However, in order to maintain the separating mechanism of minimum length and to insure utilization of the separating action of the latter throughout its full length, means are provided for insuring that the straw discharged from the threshing cylinder is deposited on the forward end of the separating mechanism.

One or more guiding baffles 102 curving toward the forward end of the separator housing are mounted on and depend from the roof of the separator housing into the path of material projected upwardly from the discharge from the threshing cylinder. These baffles 102 preferably extend to gradually increasing distances transversely of the separating chamber, and may be of gradually increasing height, toward the discharge end of the separator housing, in order to secure the desired baffling and guiding effect. The material discharged from the cylinder housing strikes these baffles and is guided thereby toward the forward end of the separator housing and drops down on the adjacent end portion of the separating mechanism, permitting utilization of the separating action of the latter on the straw throughout the full length of the separator. Due to the fact that the separating mechanism is beneath the direct path of the portion of the air blast of greater pressure during the discharge of material from the threshing cylinder, the straw dropping on the rack is moved along toward the discharge end of the separating mechanism substantially under the influence of the shaking motion of the separating mechanism.

The forward end wall of the separating housing 15 may be provided with a transversely extending baffle 102a extending across substantially the major portion of the width of the housing and extending downwardly at an angle. This baffle 102a serves to deflect onto the forward end of the separating mechanism grain and straw particles projected against the forward end wall, thus preventing them from passing downwardly between the end of the rack and the adjacent wall of the separator housing.

The separating mechanism includes devices for shaking the straw and recovering threshed grain therefrom, these devices including a straw shaking rack 103 comprising as essential parts a frame extending the full length and approximately the full width of the separator housing and spaced transverse slats 104, 105 carried by the frame.

The shaking rack is suitably mounted in operative position on supporting links, a forward one of which is indicated at 112, to provide for the desired oscillating and shaking motion, which may be accomplished through suitable shaking levers. The rack may be provided with auxiliary riser bars, indicated at 120, to hold the straw from packing on the cross slats 104, 105.

Through the normal shaking action of the rack, the straw and grain are advanced rearwardly along the rack, that is, in the direction of discharge from the separator housing, the threshed grain, along with relatively short pieces of straw and chaff, falling through the spaces between the rack slats 104, 105 as the straw is advanced through the oscillating or vibrating action of the separating rack; and the straw is finally forced over the discharge end of the rack directly into the field.

During operation of the straw rack, threshed grain and some chaff dropping through the spaces between the slats 104, 105 fall onto the bottom plate 132 of the separator housing. A grain drag or rake 135 of conventional design is provided within the separator housing below the straw rack, this drag or rake including a pair of endless chains passing over driving sprockets at the rear end of the separator and over suitable sprockets 137 at the front end of the housing, with spaced transverse raking bars 138 extending between and connecting the chains.

The grain drag is so disposed relative to the bottom wall 132 that the lower course of the drag brushes over the upper surface of the bottom wall 132 of the housing; and carries grain falling thereon rearwardly along the plate to the forward edge thereof, where it drops onto a suitably disposed fanning or cleaning device, not shown.

172 represents a tailings conveyer having a discharge spout 173 at its upper end through which tailings are fed to an inlet 174 of a recleaning device 176, the latter including a screen 178 on which the tailings are received, clean grain being discharged therefrom through a spout 179 and chute 181 into the forward end of the separator housing where the grain drag conveys this clean grain rearwardly. Tailings passing along the screen 178 are discharged through a spout 182 into a chute 183 which conveys such tailings to an opening in the upper wall of the cylinder housing at the forward side thereof, so that these tailings are again subjected to the action of the threshing mechanism and discharged therefrom onto the forward portion of the separator rack. The recleaner is mounted on pivoted supporting links 184, 185, and a suitably actuated pitman rod 186 imparts the desired shaking motion to the recleaner.

Clean grain from the separating rack and cleaning device is received in a well portion 152 of the bottom wall of a separator housing and is conveyed therefrom forwardly of the machine by a conventional screw conveyer mounted on the shaft 154, through a conveyer housing section 187 and to a bottom well portion of an elevating conveyer 189, the latter being carried by and associated with the structure of the grain bin 16 into which the elevating conveyer may be arranged to discharge the clean grain.

Power for operating various mechanisms of the apparatus is derived from a drive shaft 207 mounted on the frame of a machine and suitably connected at its forward end to a power source, such as the power takeoff of a tractor, this drive shaft 207 being connected to drive the conveyer shaft 154 and also being suitably connected to drive the transverse shaft 223.

A V-groove sheave 226, the latter being connected with a V-groove sheave 227 on the operating shaft 82 of the threshing cylinder, through a V-belt 228, preferably with a suitable idler sheave cooperating with the belt to secure the desired tension thereof. A second V-groove sheave 229 is mounted on the shaft 223 and is connected through a V-belt 231 to a V-pulley 232 on the operating shaft 79 of the upper roller 76 of the feeding conveyer 75, and to a V-pulley 234 mounted on the inner side wall of the header frame, preferably through a suitable idler pulley. The sheave 234 may be used to operate a sickle at the forward end of the header frame. The shaft 39a of the upper roller 39 of the main feed draper 38 may be driven through a flexible belt drive from the shaft 79 of the auxiliary draper 75. A flexible belt drive 258 from a traction wheel axle to a pulley or sprocket on a shaft 257, thence through a V-belt 260, may serve as a drive for a rotatable gathering reel mounted on the header frame.

The diameters of the various driving and driven pulleys may be so selected as to give the desired normal speeds of rotation to the driven shafts. Further adjustment of the speeds of the individual driven shafts may be secured through the use of V-groove pulleys of known design wherein provisions are made for adjusting the width of the space between the side walls of the belt groove, thus permitting the driving belt to sink to variable distances in the groove and thereby providing at will a considerable range of effective pitch diameters of the sheaves.

The matter of facility for adjustment of the speed of the threshing cylinder for different crops is a matter of considerable importance, particularly with a threshing mechanism of the character described hereinabove where the cut grain is fed in a relatively thin stream of a width corresponding to the length of the sickle, for most efficient results in the matter of maximum recovery of clean grain or seed without cracking or damage to the latter are to be secured at different operating speeds for different crops, and often for the same crop under varying conditions of the crop, such as size of stalks and amount of weeds included with the crop.

It should be understood that features and operating effects of the invention disclosed hereinabove have definite commercial applications and utility other than in the particular apparatus described and the invention is to be considered as embracive of these various applications and utilities. And it is not desired that the invention be limited to the exact details of construction shown and described herein for obvious modifications may occur to persons skilled in the art.

It is claimed and desired to secure by Letters Patent:

1. In a threshing apparatus, threshing mechanism comprising a rotatable threshing element and a relatively fixed threshing element, and means providing for the feed of material to said threshing mechanism transversely of the axis of rotation of said rotatable threshing element across the major portion of the axial length thereof, said rotatable threshing element being provided with a plurality of circumferentially spaced, longitudinally extending, rigid threshing bars provided at their leading faces with a substantially unbroken surface portion of resiliently yieldable material presenting a resiliently yieldable impact threshing surface extending outward in a direction whose major component is radial, said fixed threshing element being disposed in position adjacent the path of said rotatable threshing bars and across which material being threshed is forced transversely of said axis and toward the discharge from said threshing mechanism during operation thereof, and said fixed threshing element including a threshing member in the form of a ledger plate element disposed at the forward edge of said fixed threshing element and extending longitudinally of said axis and projecting rearwardly into proximity to the path of travel of said rotatable threshing bars, said ledger plate being provided at its upper face adjacent said path of travel with a surface portion of resiliently yieldable material across which the material to be threshed is fed rearwardly into the path of travel of said rotatable threshing bars.

2. In a threshing apparatus, threshing mechanism comprising a rotatable threshing element and a relatively fixed concave threshing element, and means providing for the feed of material to said threshing mechanism transversely of the axis of rotation of said rotatable threshing element across the major portion of the axial length thereof, said rotatable threshing element being provided at its periphery with a plurality of circumferentially spaced and longitudinally extending rigid threshing members provided at their leading faces with a longitudinally extended surface portion of resiliently yieldable material presenting a substantially continuous resiliently yieldable impact threshing surface extending outwardly in a direction having its major component radial of said rotatable element, the radially outer edges of said bars being relatively smooth and unbroken, a fixed concave threshing element having one or more longitudinally extending, spaced, bar-like threshing members upon its inner surface and disposed in position adjacent the path of said rotatable threshing members and across which material being threshed is forced transversely of said axis and toward the discharge from said threshing mechanism during operation, said threshing members of said concave having their leading faces provided with a facing portion of resiliently yieldable material and inclined in the direction of travel of said rotatable threshing members from a plane including the axis of said rotatable threshing element.

3. In a threshing apparatus, threshing mechanism comprising a rotatable threshing element and a relatively fixed and substantially imperforate concave threshing element, and means for feeding material to said threshing mechanism in a direction transverse to the axis of rotation of said rotatable threshing element across the major portion of the axial length thereof, said rotatable threshing element being provided at its periphery with a plurality of circumferentially spaced threshing bars extending throughout the length of said element, said bars being relatively rigid and unyielding and having their leading edges provided with a longitudinally extending and substantially unbroken facing of resiliently yieldable material and their radially outer edges uncovered and relatively smooth, said facing presenting a resiliently yieldable impact threshing surface the general plane of which lies substantially radial of the rotatable threshing element, said concave threshing element having a relatively rigid, substantially axially extending, raised bar-like threshing element having its leading edge portion of resiliently yieldable material and being disposed in position to the rear of and spaced from the leading edge of said concave and adjacent the path of said rotatable threshing bars and across which material being threshed is forced transversely of said axis and toward the discharge from said threshing mechanism during operation thereof.

4. In a threshing apparatus, threshing mechanism comprising a rotatable threshing element and a relatively fixed concave threshing element, and means for feeding material to said threshing mechanism in a direction transverse to the axis of rotation of said rotatable threshing element across the major portion of the axial length thereof, said rotatable threshing element being provided with a plurality of circumferentially spaced, longitudinally extending, relatively rigid threshing bars, said fixed concave threshing element having a substantially axially extending bar-like threshing element of resiliently yieldable material disposed in position to the rear of and spaced from the leading edge of said concave element and adjacent the path of said rotatable threshing members and across which material being threshed is forced transversely of said axis and toward the discharge from said threshing mechanism during operation thereof, and a clamping strip embracing a portion of the inner surface of said fixed threshing element and securing said element in position.

5. In a threshing apparatus, threshing mechanism comprising a rotatable threshing element and a relatively fixed concave threshing element, and means for feeding material to said threshing mechanism in a direction transverse to the axis of rotation of said rotatable threshing element across the major portion of the axial length thereof, said rotatable threshing element being provided at its periphery with a plurality of circumferentially spaced, longitudinally extending, relatively rigid threshing bars extending throughout the length of said rotatable threshing element in the general direction of the axis thereof and provided at their leading faces with a substantially unbroken surface portion of resiliently yieldable material presenting a substantially continuous resiliently yieldable impact threshing surface extending outwardly in a direction having its major component radial of said rotatable element, the radially outer edges of said bars being relatively smooth, and said fixed concave threshing element having one or more spaced bar-like and substantially axially extending threshing members having the leading edge thereof provided with a facing of resiliently yieldable material and disposed at the inner surface of said concave element in relatively close proximity to said rotatable threshing elements.

6. In a threshing apparatus, threshing mechanism comprising a rotatable threshing element and a relatively fixed concave threshing element, and means for feeding material to said threshing mechanism in a direction transverse to the axis of rotation of said rotatable threshing element across the major portion of the axial length thereof, said rotatable threshing element being provided at its periphery with a plurality of circumferentially spaced, longitudinally extending, relatively rigid threshing bars extending throughout the length of said rotatable element in the general direction of the axis thereof and provided at their leading faces with a surface portion of resiliently yieldable material presenting a substantially continuous resiliently yieldable impact threshing surface extending outwardly in a direction having its major component radial of said rotatable element, and said fixed threshing element having at its forward edge a ledger plate extending longitudinally in the direction of the axis of said rotatable threshing element and projecting rearwardly toward and into proximity to the path of travel of said rotatable threshing bars, said ledger plate having at its upper face a surface portion of resiliently yieldable material across which material to be threshed is fed rearwardly into the path of travel of said rotatable threshing bars, and a bar-like threshing element in the rear of and spaced from said plate-like threshing element and having its leading face portion of resiliently yieldable material and inclined rearwardly in the direction of travel of said rotatable threshing bars and extending longitudinally of the axis of said rotatable threshing element and disposed in relatively close proximity to said rotatable threshing bars.

7. In a threshing apparatus, threshing mechanism suitable for operation at high speed and comprising a rotatable threshing element and a relatively fixed concave threshing element, and means providing for the feed of material to and its discharge from said threshing mechanism transversely of the axis of rotation of said rotatable threshing element, said latter element being provided at its periphery with a plurality of circumferentially spaced, longitudinally extending, relatively rigid threshing bars comprising a metallic reinforcing or strengthening element and a longitudinally extended and substantially unbroken facing of resiliently yieldable material at its leading edge and presenting a resiliently yieldable impact threshing surface extending outwardly in a direction whose major component is radial of said rotatable element, and said fixed concave threshing element being provided with one or more longitudinally extending threshing members disposed in position adjacent the path of said rotatable threshing bars and provided at their leading edges with a facing of resiliently yieldable material.

8. In a threshing apparatus, threshing mechanism suitable for operation at high speed and comprising a rotatable threshing element and a relatively fixed threshing element, and means providing for the feed of material to and its discharge from said threshing element transversely of the axis of rotation of said rotatable threshing element, said rotatable threshing element being provided with a plurality of circumferentially spaced, longitudinally extending, rigid metal threshing bars provided at their leading faces with a covering of resiliently yieldable material presenting a substantially continuous and unbroken resiliently yieldable impact threshing surface extending outwardly in a direction whose major component is radial of said rotatable threshing element, the material of said bars being uncovered at their radially outer edges, and said relatively fixed concave threshing element being provided with one or more longitudinally extending threshing members disposed in position adjacent the path of said rotatable threshing bars the leading faces of said concave threshing members having a facing of resiliently yieldable material the leading surface of which is inclined rearwardly from the radial in the direction of travel of said rotatable threshing bars.

9. In a threshing apparatus, threshing mechanism suitable for operation at high speed and comprising a rotatable threshing element and a relatively fixed threshing element, and means providing for the feed of material to and its discharge from said threshing mechanism transversely of the axis of rotation of said rotatable threshing element across the major portion of the axial length thereof, said rotatable threshing element being provided at its periphery with a plurality of circumferentially spaced, longitudinally extending, relatively rigid threshing bars each providing an impact threshing member having at its leading edge a longitudinally extended and substantially continuous impact threshing surface of resiliently yieldable material extending substantially radially of the rotatable threshing element, and said relatively fixed concave threshing element being provided with one or more longitudinally extending threshing members having their leading edges provided with a facing of resiliently yieldable material and disposed in position adjacent the path of said rotatable threshing bars and across which the material being threshed is forced transversely of said axis and toward the discharge from said threshing mechanism during operation thereof.

10. A threshing apparatus, comprising a rotatable threshing cylinder provided with longitudinally extending, relatively rigid, threshing bars and a stationary threshing element provided with one or more longitudinally extending threshing bars slightly spaced from the path of said cylinder bars, wherein the material to be threshed is fed to and passed between the threshing bars of said cylinder and said stationary threshing element transversely of the axis of said cylinder, and wherein the threshing bars of said cylinder are provided with rubber or like resilient facings on their leading edges or sides presenting longitudinally extending impact threshing surfaces extending outwardly in a direction whose major component is radial of said rotatable cylinder.

11. A threshing apparatus, comprising a rotatable threshing cylinder provided with longitudinally extending and relatively rigid threshing bars and a stationary threshing element provided with one or more longitudinally extending threshing bars slightly spaced from the path of said cylinder bars, wherein the material to be threshed is fed to and passed between the threshing bars of said cylinder and said stationary threshing element transversely of the axis of said cylinder, and wherein the threshing bars of said cylinder have their leading edges or sides provided with a facing of rubber or like resiliently yieldable material presenting a longitudinally extended and substantially unbroken impact threshing surface which extends substantially radially of the cylinder, and the threshing bars of said stationary threshing element have their leading edges or sides provided with a facing of rubber or like resiliently yieldable material whose leading surface is inclined rearwardly in the direction of travel of material through the threshing mechanism.

WALTER R. DRAY.